United States Patent [19]

Nakahama

[11] Patent Number: 4,882,228

[45] Date of Patent: Nov. 21, 1989

[54] MULTILAYER COATED FILM STRUCTURES

[75] Inventor: Tadamitsu Nakahama, Hiroshima, Japan

[73] Assignee: Mazda Motor Corporation, Hiroshima, Japan

[21] Appl. No.: 184,880

[22] Filed: Apr. 22, 1988

[30] Foreign Application Priority Data

Apr. 23, 1987 [JP] Japan .................................. 62-100281

[51] Int. Cl.⁴ ............................................. B32B 15/08
[52] U.S. Cl. ................................ 428/421; 427/407.1; 427/409; 428/461
[58] Field of Search ............................ 427/407.1, 409; 428/421, 461

[56] References Cited

U.S. PATENT DOCUMENTS

| | | | |
|---|---|---|---|
| 4,022,955 | 5/1977 | Nishizawa et al. | 525/328.8 |
| 4,358,508 | 11/1982 | Tanaka et al. | 428/458 |
| 4,533,703 | 8/1985 | Kordomenos et al. | 427/409 |
| 4,548,986 | 10/1985 | Suzuki et al. | 525/66 |
| 4,551,491 | 11/1985 | Panush | 427/409 |
| 4,719,132 | 1/1988 | Porter | 427/409 |
| 4,728,543 | 3/1988 | Kurauchi et al. | 427/409 |

FOREIGN PATENT DOCUMENTS

| | | | |
|---|---|---|---|
| 000022 | 12/1978 | European Pat. Off. | 428/421 |
| 61-197074 | 6/1986 | Japan . | |
| 2156951 | 7/1987 | Japan | 428/421 |

*Primary Examiner*—Edith Buffalow
*Attorney, Agent, or Firm*—Gerald J. Ferguson, Jr.

[57] ABSTRACT

A multilayer coated film structure comprises an undercoat layer provided on a predetermined surface, such as a surface of a vehicle body, an intermediate coat layer put on the undercoat layer, a final coat layer of one of melamine alkyd resin coating and melamine acrylic resin coating including an antioxidant within the range of 1.0 to 5.0% by weight and put on the intermediate layer, and a hyaline coating layer of fluorocarbon resin put on the final coat layer. As the case may be, the final coat layer further includes a surface conditioning agent.

8 Claims, 1 Drawing Sheet

MULTILAYER COATED FILM STRUCTURES

BACKGROUND OF THE INVENTION

1. Field of the Invention

The present invention relates generally to multilayer coated film structures used, for example, on a vehicle body, and more particularly, is directed to an improved multilayer coated film structure including an undercoat layer, an intermediate coat layer, a final coat layer and a hyaline coating layer of fluorocarbon resin, in which the hyaline coating layer of fluorocarbon resin is provided on the finish coat layer for forming a uniform outer cover of the film structure.

2. Description of the Prior Art

Color coatings provided on vehicle bodies have been broadly divided into two categories, one of which is characterized by a solid final coat layer made mainly of melamine alkyd resin and the other of which is characterized by a metallic final coat layer made mainly of melamine acrylic resin. Each of the solid and metallic final coat layers is subjected to fading of color caused due to a secular change, and it is necessary for avoiding such deterioration in color of the solid or metallic final coat layer to maintain a surface of the solid or metallic final coat layer so as to be waxed or provided with other surface treatments periodically. Such maintenance of the color coating on the vehicle body as to wax the surface of the solid or metallic final coat layer periodically requires usually a user of a vehicle to have an annoying work frequently.

In this connection, for the purpose of obtaining a maintenance-free color coating covering an automobile, there has been proposed a multilayer coated film including a hyaline coating layer of fluorocarbon resin provided on a finish coat layer formed ordinarily, as disclosed in the Japanese patent application published before examination under publication number 61-197074. Such a previously proposed multilayer coated film is not in need of being waxed periodically because the hyaline coating layer of fluorocarbon resin provided on the finish coat layer is superior in weather resistance.

However, the fluorocarbon resin is generally inferior in both of adhesion and wettability so as to exhibit repellent phenomenon on the occasion of being disposed on the final coat layer of the color coating to form the hyaline film, and therefore there is a problem that it is difficult to have the hyaline coating layer of fluorocarbon resin which is put on the final coat layer of the color coating to form a uniform and smooth surface.

OBJECTS AND SUMMARY OF THE INVENTION

Accordingly, it is an object of the present invention to provide a multilayer coated film structure including a hyaline coating layer of fluorocarbon resin, which avoids the aforementioned problem encountered with the prior art.

Another object of this invention is to provide a multilayer coated film structure including an undercoat layer, an intermediate layer, a final coat layer and a hyaline coating layer of fluorocarbon resin, in which the hyaline coating layer is put on the final coat layer to have a uniform and smooth surface without exhibiting repellent phenomenon.

A further object of the invention is to provide a multilayer coated film structure including an undercoat layer, an intermediate layer, a final coat layer and a hyaline coating layer of fluorocarbon resin, in which the hyaline coating layer is put on the final coat layer to form a uniform and smooth outer cover of the film structure.

According to the present invention, there is provided a multilayer coated film structure comprising an undercoat layer provided on a predetermined surface, an intermediate coat layer put on the undercoat layer, a final coat layer of one of melamine alkyd resin coating and melamine acrylic resin coating including an antioxidant within the range of 1.0 to 5.0% by weight and put on the intermediate layer, and a hyaline coating layer of fluorocarbon resin put on the final coat layer.

In an embodiment of multilayer coated film structure according to the present invention, the final coat layer includes a surface conditioning agent not more than 0.5% by weight in addition to the antioxidant within the range of 1.0 to 5.0% by weight.

In the multilayer coated film structure thus constituted in accordance with the present invention, the wettability of the hyaline coating layer of fluorocarbon resin to the final coat layer is improved by the antioxidant included in the final coat layer to be within the range of 1.0 to 5.0% by weight so that the hyaline coating layer of fluorocarbon resin is improved in adhesion to the final coat layer. Therefore, the hyaline coating layer of fluorocarbon resin has a uniform and smooth surface without exhibiting repellent phenomenon on the final coat layer.

In the embodiment, the surface of the final coat layer is improved in smoothness by the surface conditioning agent included in the final coat layer to be not more than 0.5% by weight without spoiling the improvement in the adhesion of the hyaline coating layer of fluorocarbon resin to the final coat layer brought about by the antioxidant included in the final coat layer.

The above, and other objects, features and advantages of the present invention will become apparent from the following detailed description which is to be read in conjunction with the accompanying drawings.

BRIEF DESCRIPTION OF THE INVENTION

FIG. 1 is a schematic fragmentary sectional view layer is improved in smoothness showing one embodiment of multilayer coated film structure according to the present invention; and FIG. 2 is a schematic fragmentary sectional view showing another embodiment of multilayer coated film structure according to the present invention.

DESCRIPTION OF THE PREFERRED EMBODIMENT

Figure 1:
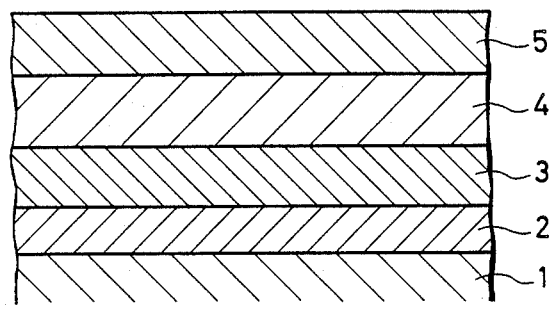

FIG. 1 shows an example of the multilayer coated film structure according to the present invention. The example shown in FIG. 1 comprises an undercoat layer 2 having a thickness of about 18±2 μ which is deposited on a surface of a steel plat 1, which forms, for example, a vehicle body and has been subjected to phosphating, by means of cation-electrodeposition and subjected to baking at temperature of about 170° C. for about 25 minutes, an intermediate coat layer 3 having a thickness of about 25±5 μ which is deposited on the undercoat layer 2 by means of spraying oil-free polyester resin and subjected to baking at temperature of about 140° C. for about 20 minutes, a solid final coat layer 4 which is deposited on the intermediate coat layer 3 to have a thickness of about 30±5 μ by means of spraying thermosetting melamine alkyd resin including hindered phenol as an antioxidant and in addition, as the case may be, dimethylpolysiloxane or organopolysiloxane as a surface conditioning agent and, 10 minutes later, subjected to baking at temperature of about 140° C. for 20 minutes, and a hyaline coating layer 5 of fluorocarbon resin which is deposited on the solid final coat layer 4 to have a thickness of about 25±5 μ by means of spraying solvent-soluble fluorine-urethane resin and, 10 minutes later, subjected to baking at temperature of about 90° C. for 30 minutes.

Table 1 mentioned below shows results of an investigation for a repellent phenomenon and a cross-cut adhesion investigation carried out for the hyaline coating layer 5 of fluorocarbon resin in each of a plurality of samples of embodiment of FIG. 1 constituted respectively as described above and having respective solid final coat layers 4 different from one another in content of the antioxidant and surface conditioning agent.

Figure 2:
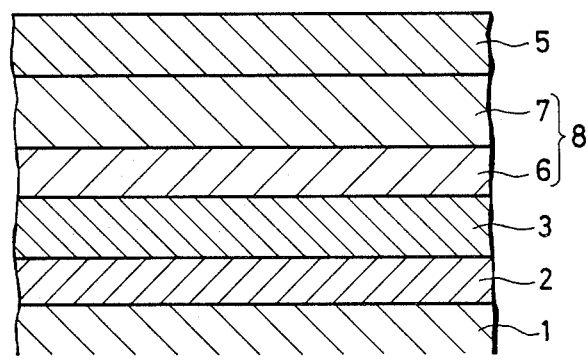

FIG. 2 shows another example of the multilayer coated film structure according to the present invention. The example shown in FIG. 2 comprises, in the same manner as the embodiment shown in FIG. 1, an undercoat layer 2 having a thickness of about 18±2 μ which is deposited on a steel plate 1 having been subjected to phosphating by means of cation-electrodeposition and subjected to baking at temperature of about 170° C. for about 25 minutes, an intermediate coat layer 3 having a thickness of about 25±5 μ which is deposited on the undercoat layer 2 by means of spraying oil-free polyester resin and subjected to baking at temperature of about 140° C. for about 20 minutes. Then, the embodiment shown in FIG. 2 further comprises a metallic final coat layer 8 consisting of a metallic base layer 6 made of thermosetting melamine acrylic resin and a clear coated layer 7 made of also thermosetting malamine acrylic resin which include at least one of hindered phenol as an antioxidant and dimethylpolysiloxane or organopolysiloxane as a surface conditioning

TABLE 1

| | | AOCT | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | | 0.5 | | | | 0.75 | | | | 1.0 | | | | 2.0 | | | | 3.0 | | | | 4.0 | | | | 5.0 | | | |
| | SO | A | | B | | A | | B | | A | | B | | A | | B | | A | | B | | A | | B | | A | | B | |
| | IN | C | D | C | D | C | D | C | D | C | D | C | D | C | D | C | D | C | D | C | D | C | D | C | D | C | D |
| | 0 | O | Δ | O | Δ | O | Δ | O | Δ | O | O | O | O | O | O | O | O | O | O | O | O | O | O | O | O | O | Δ |
| | 0.1 | X | Δ | X | Δ | X | Δ | X | Δ | O | O | Δ | O | O | O | O | O | O | O | O | O | O | O | O | O | Δ | O | Δ |
| SC | 0.2 | X | Δ | X | Δ | X | Δ | X | Δ | O | O | Δ | O | O | O | Δ | O | O | O | O | O | O | O | O | O | Δ | O | Δ |
| CT | 0.3 | X | Δ | X | Δ | X | Δ | X | Δ | Δ | O | X | O | Δ | O | Δ | O | O | O | O | O | O | O | O | O | Δ | O | Δ |
| | 0.4 | X | Δ | X | Δ | X | Δ | X | Δ | O | X | O | Δ | O | X | O | O | Δ | O | O | O | O | O | O | O | Δ | O | Δ |
| | 0.5 | X | X | X | X | X | Δ | X | Δ | O | X | O | Δ | O | X | O | O | Δ | O | O | O | Δ | O | O | O | Δ | O | Δ |
| SC CT | 0.6 | X | X | X | X | X | Δ | X | X | O | X | O | X | O | X | O | X | O | X | O | X | O | X | O | X | Δ | X | Δ |
| | 0.8 | X | X | X | X | X | X | X | X | Δ | X | Δ | X | O | X | O | X | O | X | O | X | O | X | O | X | Δ | X | Δ |
| | 1.0 | X | X | X | X | X | X | X | X | Δ | X | X | X | O | X | O | X | O | X | O | X | O | X | O | X | Δ | X | Δ |

AOCT: Content of antioxidant
SC: Surface conditioning agent
CT: Content of surface conditioning agent
SO: Sort of surface condisioning agent
A: Organopolysiloxane
B: Dimethylpolysiloxane
IN: Investigation
C: Repellent phenomenon
O: Superior
Δ: Remediable
X: Irremediable
D: Adhesion (Rate of peeling)
O: less than 7%
Δ: 7 to 30%
X: more than 30%

As understood from Table 1, in case of the sample having the solid final coat layer 4 which does not include the surface conditioning agent but includes the antioxidant, the hyaline coating layer 5 of fluorocarbon resin is favorable in both the repellent phenomenon and the adhesion on the solid final coat layer 4 when the content of the antioxidant in the solid final coat layer 4 is within the range of 1.0 to 5.0% by weight. Further, in case of the sample having the solid final coat layer 4 which include the surface conditioning agent, the hyaline coating layer 5 of fluorocarbon resin is rather good in both the repellent phenomenon and the adhesion on the solid final coat layer 4 and a surface of the solid final coat layer 4 is improved in smoothness when the content of the surface conditioning agent in the solid final coat layer 4 is not more than 0.5% by weight.

Incidentally, in case of the sample which has the solid final coat layer 4 including the antioxidant more that 5.0% by weight, the hyaline coating layer 5 of fluorocarbon resin dose not harden properly at the baking so that the whole multilayer coated film structure can not be put to practical use.

agent and are formed by putting the metallic base layer 6 on the intermediate coat layer 3 to have a thickness of about 18≈3 μ, putting the clear coating layer 7 on an a wet-on-wet basis on the metallic base layer 6 to have a thickness of about 30±5 μ, and 10 minutes later, causing both the metallic base layer 6 and the clear coating layer to be subjected to baking at temperature of about 140° C. for about 20 minutes, and a hyaline coating layer 5 of fluorocarbon resin which is deposited on the metallic final coat layer 8 to have a thickness of about 25±5 μ by means of spraying solvent-soluble fluorine-urethane resin and, 10 minutes later, subjected to baking at a temperature of about 90° C. for 30 minutes.

Table 2 mentioned below shows results of an investigation for a repellent phenomenon and a cross-cut adhesion investigation carried out for the hyaline coating layer 5 of fluorocarbon resin in each of a plurality of samples of the embodiment of FIG. 2 constituted respectively as described above and having respective metallic final coat layers 8 different from one another in content of the antioxidant and surface conditioning agent.

TABLE 2

| | | | AOCT | | | | | | | | | | | | | | | | | | | | | | | | | |
|---|---|---|---|---|---|---|---|---|---|---|---|---|---|---|---|---|---|---|---|---|---|---|---|---|---|---|---|---|
| | | | 0.5 | | | | 0.75 | | | | 1.0 | | | | 2.0 | | | | 3.0 | | | | 4.0 | | | | 5.0 | | | |
| | | SO | A | | B | | A | | B | | A | | B | | A | | B | | A | | B | | A | | B | | A | | B | |
| | | IN | C | D | C | D | C | D | C | D | C | D | C | D | C | D | C | D | C | D | C | D | C | D | C | D | C | D |
| | | 0 | O | Δ | O | Δ | O | Δ | O | Δ | O | O | O | O | O | O | O | O | O | O | O | O | O | O | O | O | O | O | O | O |
| | | 0.1 | Δ | Δ | X | Δ | Δ | Δ | X | Δ | O | O | Δ | O | O | O | O | O | O | O | O | O | O | O | O | O | O | O | O | O |
| SC | | 0.2 | X | Δ | X | Δ | Δ | Δ | X | Δ | O | O | X | O | O | O | X | O | O | O | Δ | O | O | O | O | O | O | O | O | O |
| | CT | 0.3 | X | Δ | X | Δ | X | Δ | X | Δ | O | O | X | O | O | O | X | O | O | O | Δ | O | O | O | O | O | O | O | O | O |
| | | 0.4 | X | X | X | X | X | Δ | X | Δ | O | O | X | O | O | O | X | O | O | O | Δ | O | O | O | O | O | O | O | O | O |
| SC | CT | 0.5 | X | X | X | X | X | Δ | X | Δ | O | O | X | O | O | O | X | O | O | O | X | O | O | O | Δ | O | O | O | Δ | O |
| | | 0.6 | X | X | X | X | X | X | X | X | Δ | O | X | O | Δ | Δ | X | O | Δ | O | X | O | Δ | O | X | O | O | O | X | O |
| | | 0.8 | X | X | X | X | X | X | X | X | Δ | X | X | X | O | X | O | X | O | X | O | X | O | X | O | O | O | X | O |
| | | 1.0 | X | X | X | X | X | X | X | X | X | X | X | X | O | X | X | X | O | X | O | X | O | X | O | X | O | X | O |

AOCT: Content of antioxidant
SC: Surface conditioning agent
CT: Content of surface condisioning agent
SO: Sort of surface Condisioning agent
A: Organopolysiloxane
B: Dimethylpolysiloxane
IN: Investigation
C: Repellent phenomenon
O: Superior
Δ: Remediable
X: Irremediable
D: Adhesion (Rate of peeling)
O: less than 7%
Δ: 7 to 30%
X: more than 30%

As understood from Table 2, in the case of the samples of the embodiment shown in FIG. 2, the results are almost the same as the results obtained on the examples of the embodiment shown in FIG. 1 has been also obtained. That is, in case of the sample having the metallic final coat layer 8 which does not include the surface conditioning agent but includes the antioxidant, the hyaline coating layer 5 of fluorocarbon resin is favorable in both the repellent phenomenon and the adhesion on the metallic final coat layer 8 when the content of the antioxidant in the metallic final coat layer 8 is within the range of 1.0 to 5.0% by weight. Further, in case of the sample having the metallic final coat layer 8 which includes the surface conditioning agent, the hyaline coating layer 5 of fluorocarbon resin is rather good in both the repellent phenomenon and the adhesion on the metallic final coat layer 8 and a surface of the metallic final coat layer 8 is improved in smoothness so as not to need to be lapped when the content of the surface conditioning agent in the metallic final coat layer 8 is not more than 0.5% by weight.

What is claimed is:

1. A multilayer coated film structure comprising, an undercoat layer provided on a predetermined surface,
a sprayed resin intermediate coat layer put on said undercoat layer,
a final coat layer of one of melamine alkyd resin coating and melamine acrylic resin coating including an antioxidant within the range of 1.0 to 5.0% by weight and put on said intermediate coat layer, and
a transparent glass-like or hyaline coating layer of fluorocarbon resin put on said final coat layer.

2. A multilayer coated film structure according to claim 1, wherein said antioxidant comprises hindered phenol.

3. A multilayer coated film structure according to claim 1, wherein said final coat layer further includes a surface conditioning agent not more than 0.5% by weight.

4. A multilayer coated film structure according to claim 3, wherein said antioxidant comprises hindered phenol.

5. A multilayer coated film structure according to claim 3, wherein said surface conditioning agent comprises one of dimethylpolysiloxane and organopolysiloxane.

6. A multilayer coated film structure according to claim 5, wherein said antioxidant comprises hindered phenol.

7. A multilayer coating for application to the surface of a metal substrate comprising:
(a) an undercoat layer directly in contact with the substrate surface;
(b) a sprayed resin intermediate coat overlaying said undercoat layer;
(c) a final coat layer overlaying said intermediate coat layer including a resin selected from the group consisting of melamine alkyd resin and melamine acrylic resin and 1.0 to 5.0% by weight of an antioxidant; and
(d) hyaline coating layer comprising a fluorocarbon resin overlaying said final coat layer.

8. A multilayer maintenance-free color coating for application to the surface of a vehicle body comprising:
(a) an undercoat layer deposited on the surface of said vehicle body;
(b an intermediate coat layer deposited on said undercoat layer;
(c) a color-containing final coat layer comprising a melamine resin and an additive selected from the group consisting of an antioxidant an a surface conditioning agent deposited on said intermediate coat layer; and
(d) a transparent, glass-like coating layer comprising a fluorocarbon resin deposited on said final coat layer.

* * * * *